Figure 1:
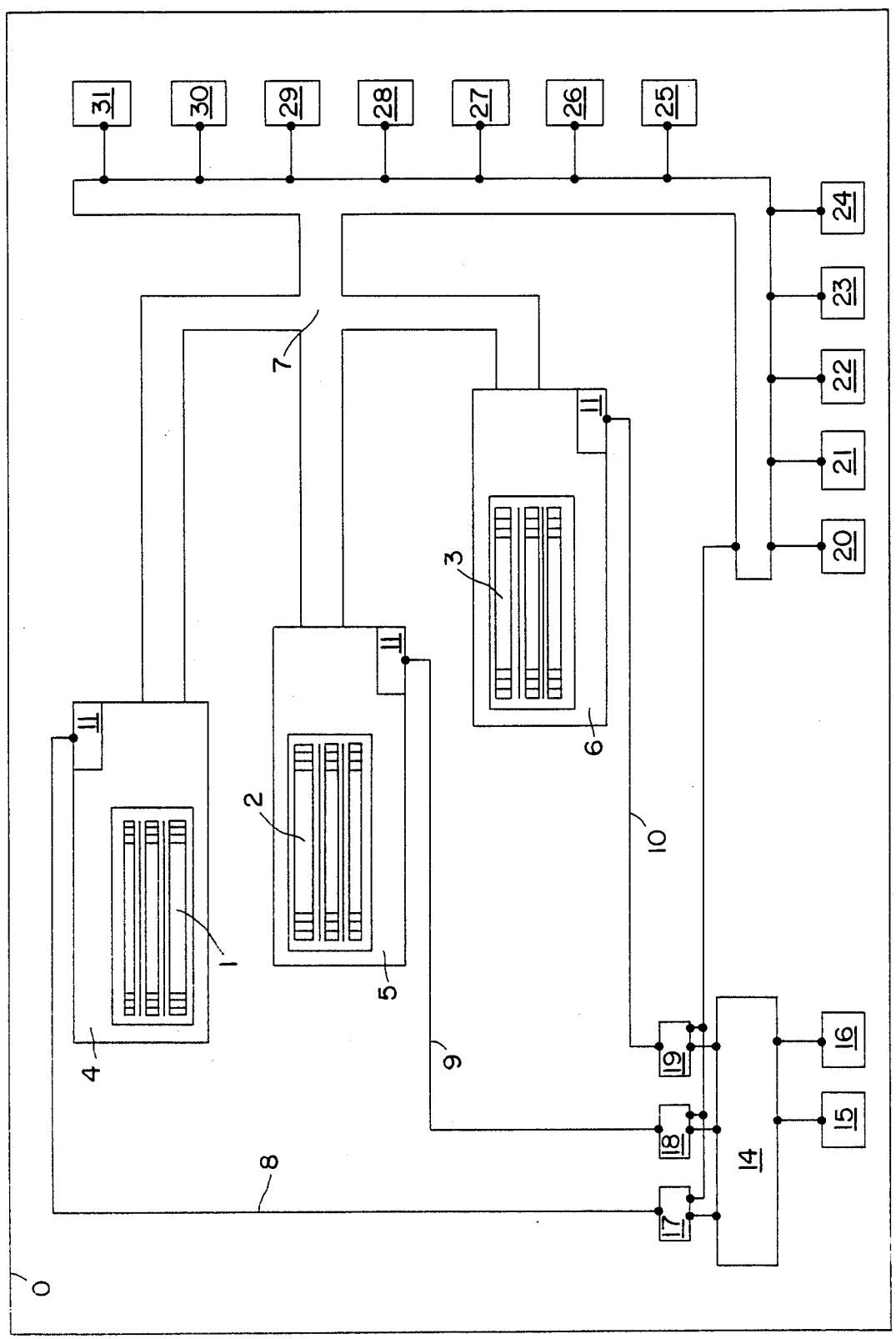

United States Patent [19]

Becker-Ross et al.

[11] Patent Number: 4,940,325
[45] Date of Patent: Jul. 10, 1990

[54] DEVICE FOR THE INVESTIGATION OF HIGHLY RESOLVED PARTIAL SPECTRA OF AN ÉCHELLE SPECTRUM

[75] Inventors: Helmut Becker-Ross; Stefan Florek; Reinhard Tischendorf, all of Berlin; Klaus-Eberhard Engel, Frankfurt an der Oder; Wolf-Ekkehard Matzke, Fürstenwalde; Susanne Engel, Frankfurt an der Oder, all of German Democratic Rep.

[73] Assignee: Akademie der Wissenschaften der DDR, Berlin, German Democratic Rep.

[21] Appl. No.: 320,674

[22] Filed: Mar. 8, 1989

[30] Foreign Application Priority Data

Mar. 11, 1988 [DD] German Democratic Rep. ... 313622

[51] Int. Cl.$^5$ .............................. G01J 3/18; G01J 3/36
[52] U.S. Cl. ..................................................... 356/328
[58] Field of Search ................................. 356/305, 328

[56] References Cited

U.S. PATENT DOCUMENTS 4,820,048 4/1989 Barnard ................................ 356/328

Primary Examiner—F. L. Evans
Attorney, Agent, or Firm—Schweitzer & Cornman

[57] ABSTRACT

The invention refers to a device for investigating highly resolved partial spectra of an échelle spectrum, being applicable to the simultaneous determination of the intensities of different spectral elements of a radiation spectrum produced by an échelle spectrometer. The device consists of a position-resolving photoelectric detector including several photosensors arranged on an IC chip, where said photosensors are arranged on the chip surface discretely at the positions of preselected spectral lines, each of the photosensors consisting of a CCD sensor row and a logic circuit which, depending on activation levels, enables supply potentials and clock signals to be connected and output signals to be transferred to a common output signal line; the areas of the individual sensor elements of the CCD sensor rows being matched to the spectral elements of the échelle spectrum and extending successively in the direction of dispersion of the échelle grating; the total number of sensor elements of all CCD sensor rows on the chip being smaller than the number of spectral elements in the échelle spectrum; and a digital logic circuit enabling, by means of the activation levels managed by it, the serial readout of the signals from a selsotable subset of all CCD sensor rows in a selectable order of succession, via the common output signal line, depending on external control signals.

5 Claims, 2 Drawing Sheets

DEVICE FOR THE INVESTIGATION OF HIGHLY RESOLVED PARTIAL SPECTRA OF AN éCHELLE SPECTRUM

SCOPE OF APPLICATION OF THE INVENTION

The invention refers to a device for the investigation of highly resolved partial spectra of an échelle spectrum, being applicable to the simultaneous determination of the intensities of different spectral elements of a radiation spectrum produced by an échelle spectrometer.

CHARACTERIZATION OF THE PRESENT STATE OF THE ART

There are several known types of échelle spectrometers where the spectrum of an extended wavelength range is resolved into a great number of orders of interference and imaged onto a small area with a great angular dispersion. To separate the overlapping spectral lines of the individual interference orders, either the wavelength range of the radiation entering the échelle spectrometer is suitably limited by inserting another spectrometer before the first one, or the individual interference orders are spatially separated by means of a second internal dispersion element, so that a planar échelle spectrum results.

In a frequently occurring application, e.g. in atomic spectrometry, it is necessary to evaluate the intensities of several spectral lines or spectral line intervals of the total spectrum simultaneously with a high time resolution. The detector systems hitherto used for this purpose can be subdivided into three groups.

1. CCD sensor rows

The limited number of sensor elements of a CCD sensor row necessarily requires a limitation of the simultaneously measurable wavelength range, depending on the spectral resolving power to be achieved. A device where spectral lines of interest are preselected from the total spectrum by means of a polychromator has been described in Spectrochim. Acta, Part B, vol. 42 B, No. 1, 1987, p. 341.

The échelle spectrometer arranged behind the polychromator merely images the partial spectra containing the preselected spectral lines onto a single CCD sensor row, within a great number of overlapping interference orders. The solution requires a very high optical and mechanical expenditure, and is impaired by frequently occurring line coincidences. The maximum number of spectral lines to be measured simultaneously is about 10.

2. Detector systems with discrete measuring points

Échelle spectrometers with an internal cross-dispersion element produce a planar spectrum where, in contrast to the system mentioned above, there is a unique correspondence between the wavelength and the position of the image on the focal plane. There are several arrangements known, which use a slit mask in the focal plane to transmit individual spectral lines to a small number of individual detectors by suitable light conducting means (e.g., U.S. Pat. No. 4 049 353, G 01 J, 3/38).

These arrangements have the disadvantage that the number of measuring points is very limited and the flexibility of changing over to other spectral lines to be investigated is restricted.

Moreover the neighbourhoods of the selected spectral lines generally cannot be measured simultaneously with the lines, e.g., for determining the spectral background.

This disadvantage also exists in the device for an optional selection of individual photodetectors arranged on a chip, as described in the DF Patent No. 2 946 862 (G 01 J, 1/42).

3. Planar detector systems

For recording the total spectrum, planar detector systems such as vidicons, image dissectors, or CCD sensor matrices are used in special applications (Y. Talmi: Multichannel Image Detectals. American Chemical Society, Washington D.C., 1979). Here problems result from the insufficient matching of the detectors to the requirements of the échelle spectrum.

In the échelle spectrum the spectral lines occur in an irregular, gappy distribution, because the individual order lines of the total spectrum are imaged with irregular spacings, curved, and with position-dependent angles of inclination. To achieve the generally required high spatial resolution of the detector over the resulting large focal area, an extremely great number of sensor elements and a high absolute accuracy of localization is required.

The deflection of the electron beams in the vacuum-electronic detector systems, being prone to interferences, represents an essential limitation of the absolute accuracy of localization, and hence of the achievable spectral resolving power of the spectrometer. This deficiency, together with the considerable space requirements of these detector, does not exist in the use of CCD sensor matrices. But in this case a reduced signal-to-noise ratio caused by the unadapted pattern of the sensor elements and the fact that the time resolution is reduced by the great number of sensor elements have a detrimental effect.

All the sensor elements of the detector, i.e., including the elements associated to the empty areas of the échelle spectrum as well as to the irrelevant spectral ranges, must always be read out, and their charges must be AD-converted, stored, and further processed.

The high demands made upon spacial resolution on the one hand and time resolution on the other generally compete with each other. None of the three groups of detector systems are adequately fitted to the special requirements of the recording of échelle spectra.

PURPOSE OF THE INVENTION

The purpose of the invention is to make the analytically relevant regions of an échelle spectrum accessible to a simultaneous measurement to be realized at a low expense, with a high time resolution and a high flexibility of selection.

EXPLANATION OF THE NATURE OF THE INVENTION

The problem to be solved by the invention is to create a device for the investigation of highly resolved partial spectra of the échelle spectrum imaged upon the focal plane of an échelle spectrometer in spectral-analytical measurements, by means of which device the analytically relevant regions of the spectrum can be measured with low redundancy, high flexibility, high time resolution, and low demands to be made upon the evaluation electronics. The invention solves the problem by designing the planar photodetector arranged in the focal plane of the échelle spectrometer as a monolithic optoelectronic component; by arranging individual modified CCD sensor rows discretely on the detector at the positions of preselected spectral lines, where the sensor elements of said rows are arranged successively in the direction of the dispersion of the échelle grating; by making the total number of sensor elements of all CCD sensor rows on the detector smaller than the number of spectral elements in the échelle spectrum; and by the use of a digital logic circuit which, by means of controlling the activation levels, allows the serial read-out of the signals of a selectable subset of all CCD sensor rows in a selectable order of succession, via a common output signal line, depending on external control signals.

The design of the detector as a monolithic optoelectronic component according to the invention ensures that the positional distribution of the modified CCD sensor rows, corresponding to the wavelength poisitions of the preselected spectral lines in the focal plane, is reproduced without any problems with a very high accuracy. For the use of the detector in the échelle spectrometer this ensures the correctness of the wavelength positions over a long period and exchangeability from one instrument to another. According to the invention, the arrangement of the rows on the detector can be exactly fitted to the positions of the preselected spectral lines in the non-equidistant, curved and inclined spectral orders of the échelle spectrum in the focal plane of the spectrometer.

The invention allows an optimum fitting of the areas of the individual sensor elements to those of the spectral elements of the échelle spectrum, which depend on the size of the entrance slit, the optical magnification of the spectrometer, the instrumental aberrations, and the measuring task.

According to the invention the number of sensor elements per row is chosen to fit the respective measuring task, so that both the spectral intensity profile of the line to be analyzed and the spectral intensity distribution in the analytically relevant spectral neighbourhood of the line can be measured simultaneously.

The rows are connected in parallel with respect to their potential and clock signal feed lines as well as to their output signal lines, said parallel connection being accomplished by means of an integrated bus, which is led directly to the connecting bond pads of the detector.

For the purpose of serial read-out the individual rows are activated by means of a special system of activation lines, where according to the invention either one-dimensional or matrix-type addressing may be used.

In addition to the known circuit elements of a CCD sensor row, according to the invention each row contains a logic circuit which, depending on the state of activation defined by means of the activation line (or lines), enables or disables the take-over of the charges, which are proportional to the photon numbers to be measured, into the transfer shift register of the row. Further, in time correlation with the state of activation, the logic circuit actuates an integrated switch arranged according to the invention, between the output amplifier of the row and the output signal line of the integrated bus.

Moreover, to minimize the power loss of the detector as a whole, the logic circuit enables supply potentials and clock pulses of the row to be switched in a suitable time sequence depending on the state of activation. Furthermore, according to the invention each of the rows may include an intermediate storage assembly between each of the sensor storage units and the transfer shift register, which, because of the parallel connection of the transfer gates between the sensor storage units and the intermediate storage units of all rows, enables the incident radiation intensities in all the rows of the whole detector to be measured simultaneously.

According to the invention, the problem of a simultaneous measurement of all rows can also be solved by buffering in the transfer shift register.

In addition to the modified CCD sensor rows, according to the invention the monolithic optoelectronic detector is provided with an integrated digital logic circuit, which activates the rows by means of the activation lines controlled by it. In its simplest design the logic circuit is a decoder circuitry whose inputs are connected to the connecting bond pads of the detector.

IMPLEMENTARY EXAMPLE

Figure 2:
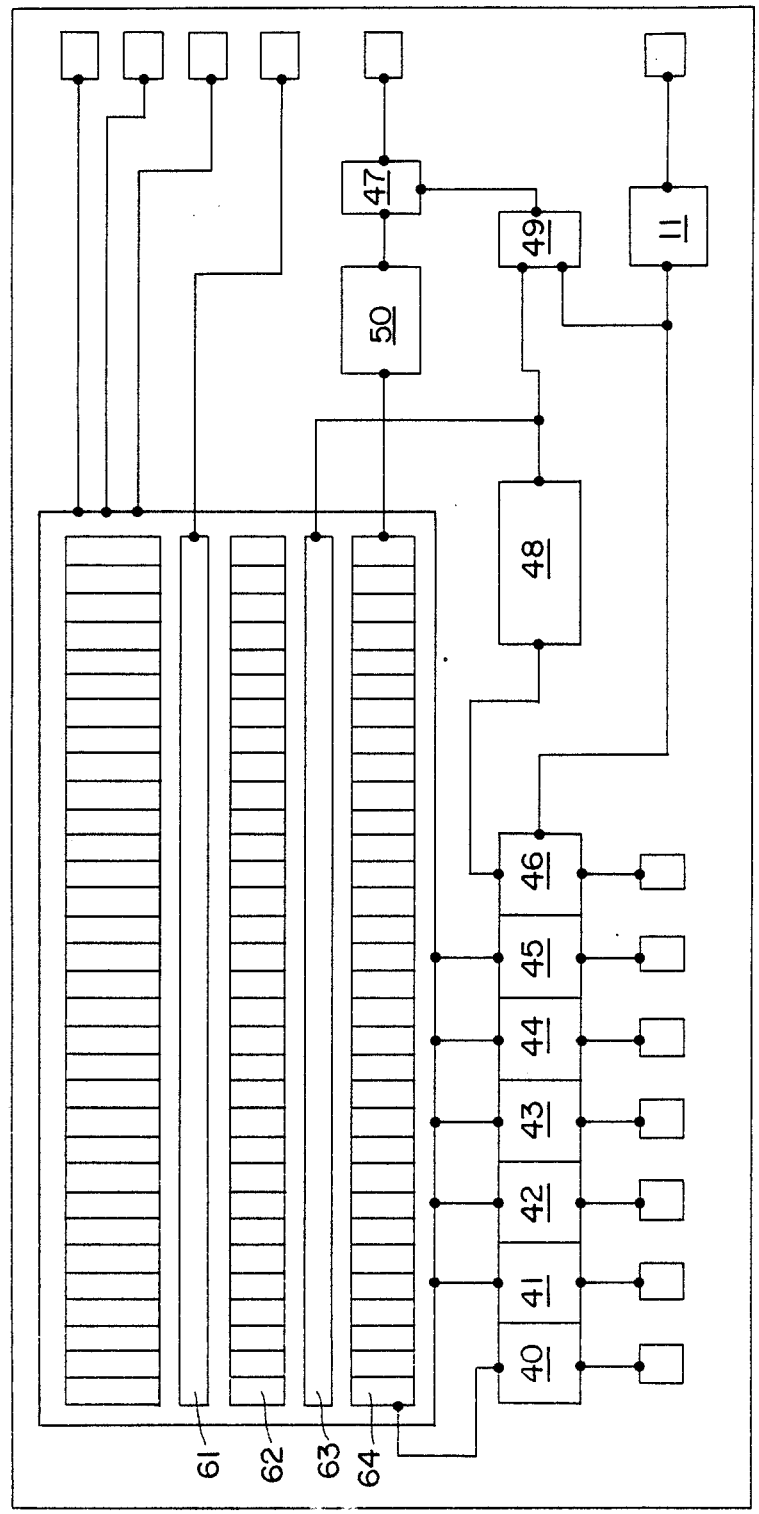

The invention will be illustrated by an implementary example, making reference to the corresponding drawing. FIGS. 1 and 2 illustrate the solution based on the invention, where FIG. 1 shows the basic design of the optoelectronic detector for an échelle spectrometer; and FIG. 2 shows the basic design of an integrated modified CCD sensor row.

On a semiconductor surface $\phi$ (chip), at three positions 1-3 corresponding to the locations of preselected spectral lines, complete CCD sensor rows 4-6, each with 32 sensor elements, are so arranged that the areas of the sensor elements are matched to the spectrometric problem setting and the spectral line appears in the central sensor field of the row (FIG. 1). All three CCD sensor rows are connected in parallel via an integrated bus 7 which, apart from the activation lines 8-10, integrates the hitherto known supply potentials and clock pulse lines as well as the common output signal line. These lines are led to the bonding pads 20-31 located on the chip edge. Moreover at least one demultiplexer 14 is integrated on the chip surface 0 for the CCD sensor rows 4-6 to be selectably activated from outside, so that the presselected CCD sensor rows 4-6 can be sequentially selected, and hence activated, from an external control unit by means of one-dimensional addressing via the activation lines 8-10 and the trigger inputs 11.

On the input side the integrated demultiplexer 14 is connected to the bonding pads 15-16.

One of three memory cells 17-19 is inserted in each of the lines connecting the outputs of the demultiplexer 14 with the activation lines 8-10, so that, after preselection by the external control unit, the CCD sensor row in question remains activated for a defined period of time, which is determined by means of an integrated dividing circuit and by counting the transfer pulses, in order to ensure complete readout of the output signals to the common output line.

Each sensor row 4 is provided with bonding pads for a trigger input 11 which, via at least one incoming activation line 8, and by means of the memory cell 17, generates an activation level at this row for a defined period of time, and with bonding pads for the digital switches 40-46 (FIG. 2) which, triggered by the same activation line, connect to the CCD sensor row the supply potentials and clock signals required for the charge transfer from the intermediate store 62 via the transfer gate 63 to the transfer shift register 64 as well as for the readout of the output data via the amplifier 50 and the switch 47 to the output signal line (FIG. 2). Furthermore the CCD sensor row is provided with a delay element 48, e.g., a 2:1 divider, which, initiated by the activation level, delays the connected transfer pulses to the transfer gate 63, to the effect that a time-shifted transfer pulse causes the charge transfer from the intermediate store 62 to the transfer shift register 64.

In synchronism with this, the delayed transfer pulse and the activation level, being connected by an AND gate 49, are used to turn on an analog switch 47 that feeds the serial output signals of the output amplifier 50 to the output signal line being common to all of the CCD sensor rows.

The chip device 0, to be used as a monolithic detector for measuring optical signals in échelle spectrometry, has to be installed in a suitable casing and adjusted in the focal plane of the échelle spectrometer.

Using an external control unit, all supply potentials and clock pulses are connected to all of the CCD sensor rows via the bus 7, so that after a defined period of measurement the charges generated in the CCD sensor elements are recorded in the intermediate stores by means of a common clock pulse sent to the transfer gate 61.

According to a selected readout sequence of the sensor rows 4, 5, 6, the external control unit transmits continuous coded addressing pulses via the bonding pads 15–16 to the demultiplexer 14, the frequency of said pulses coinciding with that of the transfer pulses of the transfer gates 63. When receiving the first addressing pulse for row 4, the demultiplexer 14 activates the activation line 8 via the memory cell 17, which causes the potential and clock lines to row 4 only to be connected to the bus 7 via the trigger input 11 and the switches 40–46, to enable the full operation of this sensor row. A subsequent transfer pulse transmitted through the bus 7 to all of the sensor rows is received only by the row 4 via the turned-on switch 46, and fed to the 2:1 divider 48. By means of the second addressing pulse for row 5, the demultiplexer 14 activates the trigger input 11 to row 5 via the memory cell 18 and the activation line 9, which in its turn causes the potential and clock lines to be connected to said trigger input. The following transfer pulse on the one hand causes triggering the delayed first transfer pulse from the divider 48 with respect to row 4, and hence the pulse for the transfer gate 63 to pass the charge packages from the intermediate store 62 to the transfer shift register 64. At the same time the switch 47 is turned on by the AND gate 49, so that the output signals generated in the amplifier 50 are transferred to the output signal line by means of the transfer clock pulses.

On the other hand this transfer pulse is fed to the 2:1 divider 48 of row 5 via the switch 46.

The third addressing pulse causes the trigger 11 of row 6 to be activated via the demultiplexer 14, and hence the connection to the bus 7. With the third transfer pulse, the readout of the output signals from row 4 is completed, the activation level of line 8 is turned off by the memory cell 17, and in row 5 the delayed transfer pulse for transferring the sensor charges to the transfer shift register is triggered and the switch 47 is turned on. At the same time this transfer pulse is read into the 2:1 divider 48 of row 6. Following this scheme, the external control unit continuously supplies addressing, transfer, and transfer clock pulses that enable the operation of the monolithic detector.

Thus, in the device according to the invention, only a small number of CCD sensor rows are fully activated and controlled simultaneously and successively by circuit engineering means, so that each preselected CCD sensor row can be fitted into the process in a condition ready for operation, and that, covering an entire scanning cycle, a continuous sequence of output signals from the preselected CCD sensor rows in the preselected order of succession is obtained in the common output signal line, up to the last CCD shift register of the last sensor row, being arranged in sequential order and comparable with a single large sensor row.

We claim:

1. Device for the investigation of highly resolved partial spectra from an échelle grating, comprising a position-resolving photoelectric detector including a plurality of photosensors arranged on an IC chip at positions of preselected spectral lines, each of said photosensors comprising (i) a CCD sensor row having sensor elements, a sensor storage device, and a transfer shift register, (ii) a logic circuit for enabling supply potentials and clock signals to be connected and output signals to be transferred to a common signal line, and (iii) an intermediate storage device disposed between said sensor storage device and said transfer shift register, a transfer gate disposed between said sensor storage device and said intermediate storage device, and a digital logic circuit for enabling upon an external control signal the serial readout of the signals from a selectable subset of all CCD sensor rows in a selectable order of succession, wherein said transfer gates and said intermediate storage devices of each of said sensor rows are connected in parallel, the areas of the individual sensor elements of said CCD sensor rows are matched to the spectral elements of the échelle spectrum and extend successively in the direction of dispersion of the échelle grating, the total number of sensor elements in all CCD sensor rows being less than the number of spectral elements in the échelle spectrum.

2. The device of claim 1, wherein the individual sensor elements of the CCD sensor rows either themselves function as storage buffers, or the device further comprises separate buffers thereof.

3. Device according to claim 1, where the height of the individual sensor elements of the CCD sensor rows is equal to the minimum distance of adjacent order lines in the échelle spectrum and the width of the individual sensor elements is equal to the instrumental width due to aberration in the échelle spectrum.

4. Device according to claim 1, where the digital logic circuit used for managing the activation levels for the individual photosensors is integrated on the IC chip.

5. Device according to claim 1, where the digital logic circuit is designed as two decoder devices managing a two-dimensional array of activation lines.

* * * * *